United States Patent Office 2,997,090
Patented Aug. 22, 1961

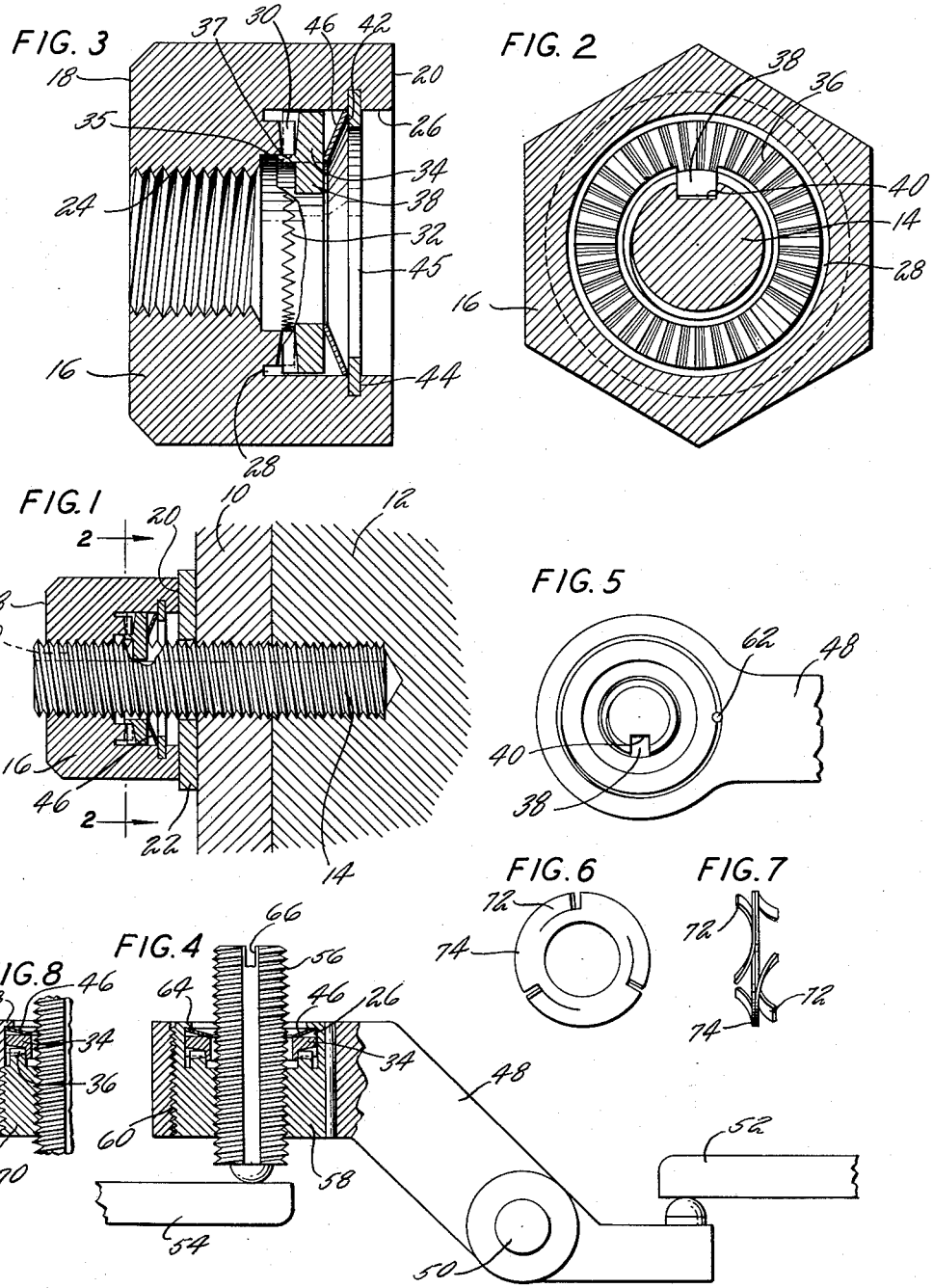

2,997,090
PAWL AND RATCHET NUT AND BOLT LOCK WITH ADJUSTABLE SPACING MEANS
John E. Anderson, Portland, Conn., assignor to United Aircraft Corporation, East Hartford, Conn., a corporation of Delaware
Filed Jan. 2, 1957, Ser. No. 632,070
1 Claim. (Cl. 151—13)

This invention relates to lock nuts and particularly to a lock nut of the two-way ratchet type.

An object of this invention is a nut lock having a compact unitary structure and long life under repeated application and removal.

A further object is a nut lock in which a washer and spring carried by the nut coact with the stud or bolt and the nut to restrain the nut against backing off under vibration, but permitting repeated removal without undue wear.

A further object is a nut lock utilizing a spring carried by the nut and urging a washer, secured against rotation relative to a bolt or stud, into ratcheting relation with the nut.

Other objects and advantages will be apparent from the following specification and the attached drawing in which:

FIG. 1 is a side elevation, partly in section, of the nut lock in position on a stud.

FIG. 2 is an enlarged end view taken along the line 2—2 of FIG. 1.

FIG. 3 is an enlarged side sectional elevation of the unitary lock nut.

FIG. 4 is a side elevation partly in section of the lock secured in a lever and used to hold an adjusting screw in adjusted position.

FIG. 5 is a top view of FIG. 4.

FIGS. 6 and 7 are front and side views, respectively, of a modified form of spring.

FIG. 8 is a partial section of a modification of the structure of FIG. 4.

In the drawings, FIG. 1 shows a nut having a lock incorporating the present invention and securing a plate 10 onto a member 12 having a stud 14 threaded therein. The nut 16 has an outer surface 18 and an opposed bearing surface 20 bearing on a washer 22 to clamp the plate 10 against the member 12. In FIG. 3, the nut has the usual internally threaded portion 24 substantially concentric with a recess 26 extending inwardly from the bearing surface 20. The bottom of the recess 26 is provided with an annular groove 28 and an annular land 30 extending from the groove radially inwardly to a bore slightly larger than the threaded portion 24 and substantially concentric therewith. The land 30 is provided with serrations 32 which may be substantially symmetrical V-grooves extending radially from the axis of the recess 26 and threaded hole 24. A washer 34 is formed with serrations 32 mating with serrations in the annular land 30. The washer 34 is provided with an upstanding piloting ring 35 which mates with a centering recess 37 in the nut. Preferably this piloting ring and the centering recess are mated on the inner diameters of the washer and the land 30. While the mating serrations have been shown as extending radially, it should be understood that they may extend obliquely or in any desired direction so long as the serrations on the washer 36 and on the annular land 30 will mate at least once per serration. The serrations may take other forms than a sharp V so long as they permit relative motion between the nut and washer in both directions when sufficient torque force is applied to the nut or washer. For instance, they could be flatted or rounded at the top or even at the top and bottom of the serrations. The radially extending serrations are, however, now preferred. The washer 34 is provided with an inwardly extending tongue 38 which fits a mating slot or keyway 40 in the stud 14 and holds the washer against rotation with the nut when the nut is turned relative to the stud 14.

A shelf or ledge 42 is formed in the recess 26 either integral with the nut as by machining or by spinning over a portion of the end of the nut as shown in FIG. 4 or, as shown in FIG. 3, by a snap ring 45 received in a slot 44 cut in the recess 26 adjacent the bearing surface 20 of the nut. A spring, 46, is shown as a Belleville-type washer in FIGS. 1, 3 and 4, but may be a washer having a series of flat springs extending outwardly therefrom as shown in FIGS. 5, 6 and 7, or any other type of spring which will give an evenly spaced or uniform substantial force over the entire face of the serrated washer throughout the slight travel distance of the washer as it is lifted from one serration to the next and still occupy a comparatively small axial space.

The structure thus far described provides a nut 16 carrying its own locking mechanism in assembled relation so that there are no parts to lose or to assemble when the nut is applied to a stud or a bolt for clamping one member or another. It should be understood that the nut is reversible, and the surface 18 instead of the surface 20 may be used as a bearing surface if desired. The holding force of the nut against backing-off may be controlled by the shape of the serrations 32 making them either steeper or more shallow so as to give a steeper or a more gradual camming action or by using a stronger or weaker spring 46. In order to move the nut in either direction it is, of course, necessary to cam the washer outward against the force of the spring utilizing the size of the serrations for the camming action. The tops of the serrations are substantially parallel so that a large bearing or wearing surface is provided which tends to give the serrations a long and useful life. The serrations should, of course, be made of a material having a wear-resisting property such as a hardened or case-hardened steel.

My invention finds particular utility in securing adjusting screws and needle valves in position. As shown in FIG. 4, a lever 48 mounted on a journal 50 may be used to connect two members 52 and 54. An adjusting screw 56 in lever 48 may be used to adjust the relative positions of the members 52 and 54. A nut 58, similar to that described above may be made integral with lever 48 or a nut insert 58 having exterior threads 60 may be threaded into the lever 48 and kept from rotating therein by a pin 62. A ledge 64 is formed by spinning over a portion of the nut insert 58 after the spring and washer have been assembled in the recess 26.

In this modification, as the adjusting screw 56 is turned by means of the screw slot 66, it will carry the washer 34 with it while the nut insert 58 remains stationary in the lever 48, thus providing a lock for the adjusting screw.

A modification of the device of FIG. 4 is shown in FIG. 8 in which the ledge 68 is formed integral with the lever 48 by drilling and tapping a hole in the lever but leaving the ledge 68. A spring 46 may then be inserted in the drilled hole and the washer then assembled on top of the spring and a nut 70 carrying the serrations 36 may be threaded into the drilled hole and kept from rotating therein in any convenient manner such as by a pin similar to the pin 62 of FIG. 5. In this construction, the force exerted by the spring 46 in resisting movement of the washer 34 may be adjusted by controlling the distance that the member 70 is threaded into the lever 48.

As shown in FIG. 5 and in FIG. 6, a spring washer formed by forcing leaves 72 out of the plane of the washer to form upstanding spring arms may be used in place of the Belleville-spring 46 if desired. In order to prevent any interference with the relative motion of the washer 34 and the ledges 42, 64 or 68, two of the washers 74 may be used back-to-back so as to permit relative movement of the two spring washers in the event that the upstanding leaves 72 should catch on either the ledge or the serrated washer.

In using a lock of this type, particularly for adjusting screws such as shown in FIG. 4, an adjustment may be readily made by counting the clicks as the washer is moved from one serration to the next. Once the adjustment has been made, the resistance to movement created by the spring 46 and the serrations, is sufficient to hold the screw 56 in adjusted position, even in use on aircraft engines which are sometimes subject to serious vibration.

Although the preferred embodiments have been shown and described, it will be apparent that various changes and modifications may be made in the construction and arrangement of the various parts without departing from the scope of this novel concept.

I claim:

Means for locking an externally threaded adjusting screw to a mating internally threaded support member adapted to be spaced from an adjacent object by said adjusting screw comprising a washer adapted to slide axially of said adjusting screw and having means coacting with the screw restraining said washer against rotation around said screw, said member having an open ended recess concentric with and extending axially of the threaded portion of said member, said washer being located in said recess and having means coacting with said member to hold said washer substantially concentric with said recess, serrations facing axially of said threaded member and extending transversely of said recess and forming a circle of serrations concentric with said threaded portion and forming at least a portion of the bottom of said recess, a mating circle of serrations on the adjacent face of said washer, the tops of the serrations in the recess and the tops of the corresponding serrations on the washer being substantially parallel, a spring means evenly urging said washer axially of said member and uniformly urging all said serrations into mating engagement, and an inwardly directed integral ledge adjacent to the open end of said recess forming a spring means support carried by said member on the opposite side of said washer, and fixing the position of one side of said spring means with respect to the bottom of said recess and maintaining a fixed spring means position as said screw is adjusted in said member and holding said washer and spring means in assembled relation in said recess with said serrations in mating engagement, said internally threaded member comprising one part carrying said fixed spring means support and a second part threaded into said one part and carrying said first mentioned serrations on one end thereof and carrying the internal threads of said internally threaded member with the spring means and washer confined between said spring means support of said one part and the serrated end of said other part whereby the force exerted by the spring means may be adjusted.

References Cited in the file of this patent

UNITED STATES PATENTS

| | | |
|---|---|---|
| 718,336 | Freund | Jan. 13, 1903 |
| 1,246,353 | Thigpen | Nov. 13, 1917 |
| 1,403,902 | Fields | Jan. 17, 1922 |
| 1,813,640 | Rossetti | July 7, 1931 |
| 2,430,606 | Franz | Nov. 11, 1947 |
| 2,731,058 | Smisko | Jan. 17, 1956 |
| 2,900,697 | Cuss | Aug. 25, 1959 |

FOREIGN PATENTS

| | | |
|---|---|---|
| 261,756 | Germany | July 1, 1913 |